United States Patent
Lingineni et al.

(10) Patent No.: US 12,307,801 B2
(45) Date of Patent: May 20, 2025

(54) EXTRACT DATA FROM A TRUE PDF PAGE

(71) Applicant: Sureprep, LLC, Irvine, CA (US)

(72) Inventors: Srinivas Lingineni, Cerritos, CA (US); Ashish Girishkumar Agrawal, Mumbai (IN)

(73) Assignee: Sureprep, LLC, Irvine, CA (US)

(*) Notice: Subject to any disclaimer, the term of this patent is extended or adjusted under 35 U.S.C. 154(b) by 431 days.

(21) Appl. No.: 17/870,225

(22) Filed: Jul. 21, 2022

(65) Prior Publication Data
US 2023/0065934 A1 Mar. 2, 2023

Related U.S. Application Data

(60) Provisional application No. 63/238,612, filed on Aug. 30, 2021.

(30) Foreign Application Priority Data

Jun. 27, 2022 (IN) .............................. 202211036780

(51) Int. Cl.
| | |
|---|---|
| G06V 30/416 | (2022.01) |
| G06F 40/186 | (2020.01) |
| G06F 40/258 | (2020.01) |
| G06V 30/148 | (2022.01) |
| G06V 30/412 | (2022.01) |

(52) U.S. Cl.
CPC .......... *G06V 30/416* (2022.01); *G06F 40/186* (2020.01); *G06F 40/258* (2020.01); *G06V 30/153* (2022.01); *G06V 30/412* (2022.01)

(58) Field of Classification Search
CPC .. G06V 30/416; G06V 30/153; G06V 30/412; G06F 40/186; G06F 40/258; G06F 40/279
See application file for complete search history.

(56) References Cited

U.S. PATENT DOCUMENTS

| | | |
|---|---|---|
| 3,963,910 A | 6/1976 | Enomoto et al. |
| 4,754,326 A | 6/1988 | Kram et al. |
| | (Continued) | |

FOREIGN PATENT DOCUMENTS

| WO | WO-2017160654 A2 * | 9/2017 | ....... G06F 17/30253 |

OTHER PUBLICATIONS

USPTO; Non-Final Office Action dated Mar. 2, 2023 in U.S. Appl. No. 17/217,917.

(Continued)

*Primary Examiner* — Wassim Mahrouka
(74) *Attorney, Agent, or Firm* — SNELL & WILMER L.L.P.

(57) ABSTRACT

The system may perform a method comprising analyzing metadata of a text layer of a page of a first pdf document to determine that the pdf document is a first true pdf document; receiving the first true pdf document, in response to the first pdf document being the first true pdf document; receiving a selection of a field including first data to be extracted from the first true pdf document; displaying the first data; creating a template including the coordinates corresponding to the selected field and the first data of the first true pdf document; and extracting from an accessible text layer of a second true pdf document, second data based on the template from the first true pdf document.

20 Claims, 5 Drawing Sheets

(56) References Cited

U.S. PATENT DOCUMENTS

| | | |
|---|---|---|
| 5,054,096 A | 10/1991 | Beizer |
| 5,144,115 A | 9/1992 | Yoshida |
| 5,404,294 A | 4/1995 | Karnik |
| 5,737,599 A | 4/1998 | Rowe et al. |
| 5,787,295 A | 7/1998 | Nakao |
| 5,848,426 A | 12/1998 | Wang et al. |
| 5,878,215 A | 3/1999 | Kling et al. |
| 5,881,381 A | 3/1999 | Yamashita |
| 5,923,842 A | 7/1999 | Pedersen et al. |
| 5,940,811 A | 8/1999 | Norris |
| 5,963,659 A | 10/1999 | Cahill et al. |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,167,370 A | 12/2000 | Tsourikov |
| 6,173,285 B1 | 1/2001 | Nishita et al. |
| 6,202,052 B1 | 3/2001 | Miller |
| 6,209,095 B1 | 3/2001 | Anderson et al. |
| 6,226,752 B1 | 5/2001 | Gupta et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |
| 6,327,574 B1 | 12/2001 | Kramer et al. |
| 6,338,138 B1 | 1/2002 | Raduchel et al. |
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 | 4/2004 | Blossman et al. |
| 6,912,508 B1 | 6/2005 | McCalden et al. |
| 6,957,384 B2 | 10/2005 | Jeffery et al. |
| 7,013,045 B2 | 3/2006 | Sommer et al. |
| 7,155,404 B1 | 12/2006 | Johnson et al. |
| 7,171,615 B2 | 1/2007 | Jensen et al. |
| 7,234,103 B1 | 6/2007 | Regan |
| 7,257,553 B1 | 8/2007 | Baker |
| 7,529,408 B2 | 5/2009 | Vohariwatt et al. |
| 7,565,312 B1 | 7/2009 | Shaw et al. |
| 7,570,842 B2 | 8/2009 | Suenaga et al. |
| 7,584,884 B2 | 9/2009 | Fox et al. |
| 7,590,572 B2 | 9/2009 | Larson |
| 7,647,258 B2 | 1/2010 | William et al. |
| 7,660,988 B2 | 2/2010 | Carmichael et al. |
| 7,742,958 B1 | 6/2010 | Leek |
| 7,747,484 B2 | 6/2010 | Stanley et al. |
| 7,752,092 B1 | 7/2010 | Mattice |
| 7,836,394 B2 | 11/2010 | Linder |
| 7,840,891 B1 | 11/2010 | Yu et al. |
| 7,853,494 B2 | 12/2010 | Wyle |
| 7,930,226 B1 | 4/2011 | Quinn |
| 7,930,642 B1 | 4/2011 | Gerde |
| 8,050,451 B2 | 11/2011 | Brundage et al. |
| 8,233,751 B2 | 7/2012 | Patel |
| 8,351,703 B2 | 1/2013 | Jain et al. |
| 8,388,440 B2 | 3/2013 | Patterson |
| 8,392,472 B1 | 3/2013 | Gupta et al. |
| 8,417,597 B1 | 4/2013 | McVickar |
| 8,520,885 B2 | 8/2013 | Tanabe |
| 8,606,665 B1 | 12/2013 | Shaw |
| 8,676,689 B1 | 3/2014 | Whelan |
| 9,141,882 B1 | 9/2015 | Cao et al. |
| 9,350,599 B1 | 5/2016 | Enright |
| 9,558,521 B1 | 1/2017 | Eftekhari |
| 9,672,487 B1 | 6/2017 | Garcia |
| 10,049,310 B2 | 8/2018 | Abou Mahmoud et al. |
| 10,210,580 B1 | 2/2019 | Paulus et al. |
| 10,229,314 B1 | 3/2019 | Mitchell |
| RE47,533 E | 7/2019 | Bartlett |
| 10,339,527 B1 | 7/2019 | Coleman et al. |
| 10,482,170 B2 | 11/2019 | Roebuck et al. |
| 10,489,645 B2 | 11/2019 | Wyle |
| 10,592,994 B1 | 3/2020 | Mishra |
| 10,621,678 B1 | 4/2020 | Ramotar |
| 10,664,819 B1 | 5/2020 | Zafar |
| 10,872,236 B1 | 12/2020 | Elor et al. |
| 11,049,235 B2 | 6/2021 | Wheaton et al. |
| 2001/0037268 A1 | 11/2001 | Miller |
| 2001/0044762 A1 | 11/2001 | Nault |
| 2002/0037097 A1 | 3/2002 | Hoyos |
| 2002/0111888 A1 | 8/2002 | Stanley et al. |
| 2002/0133410 A1 | 9/2002 | Hermreck et al. |
| 2002/0161698 A1 | 10/2002 | Wical |
| 2002/0161796 A1 | 10/2002 | Sylthe |
| 2002/0184125 A1 | 12/2002 | Cirulli et al. |
| 2003/0036912 A1 | 2/2003 | Sobotta et al. |
| 2003/0046112 A1 | 3/2003 | Dutta |
| 2003/0061131 A1 | 3/2003 | Parkan, Jr. |
| 2003/0163547 A1 | 8/2003 | Beisty et al. |
| 2003/0231344 A1 | 12/2003 | Fast |
| 2003/0233296 A1 | 12/2003 | Wagner |
| 2004/0024665 A1 | 2/2004 | Foster |
| 2004/0030702 A1 | 2/2004 | Houston |
| 2004/0078271 A1 | 4/2004 | Morano et al. |
| 2004/0088233 A1 | 5/2004 | Brady et al. |
| 2004/0150854 A1 | 8/2004 | Sprague et al. |
| 2004/0216057 A1 | 10/2004 | Wayle et al. |
| 2004/0225581 A1 | 11/2004 | Wyle et al. |
| 2004/0243626 A1 | 12/2004 | Wyle et al. |
| 2005/0038722 A1 | 2/2005 | Throndson et al. |
| 2005/0060234 A1 | 3/2005 | Reahard |
| 2005/0065852 A1 | 3/2005 | Bross et al. |
| 2005/0102283 A1 | 5/2005 | Anderson et al. |
| 2005/0131805 A1 | 6/2005 | Bross |
| 2005/0265595 A1 | 12/2005 | Sawa et al. |
| 2006/0026083 A1 | 2/2006 | Wyle |
| 2006/0026086 A1 | 2/2006 | Jim |
| 2006/0028520 A1 | 2/2006 | Vonwiller et al. |
| 2006/0107206 A1 | 5/2006 | Koskimies |
| 2006/0155618 A1 | 7/2006 | Wyle |
| 2006/0178961 A1 | 8/2006 | Stanley et al. |
| 2006/0180650 A1 | 8/2006 | Claessens et al. |
| 2006/0271519 A1 | 11/2006 | Blackwood |
| 2007/0033118 A1 | 2/2007 | Hopkinson |
| 2007/0165904 A1 | 7/2007 | Nudd et al. |
| 2007/0250392 A1 | 10/2007 | Paulsen et al. |
| 2007/0250418 A1 | 10/2007 | Banks et al. |
| 2007/0271249 A1 | 11/2007 | Cragun et al. |
| 2008/0005024 A1 | 1/2008 | Kirkwood |
| 2008/0077503 A1 | 3/2008 | Zias et al. |
| 2008/0082432 A1 | 4/2008 | Baker |
| 2008/0120129 A1 | 5/2008 | Seubert et al. |
| 2008/0147494 A1 | 6/2008 | Larson |
| 2008/0189197 A1 | 8/2008 | Allanson et al. |
| 2008/0228714 A1 | 9/2008 | Prager et al. |
| 2008/0263370 A1 | 10/2008 | Hammoutene |
| 2008/0319882 A1 | 12/2008 | Wyle |
| 2010/0074509 A1 | 3/2010 | Laaser et al. |
| 2010/0161460 A1 | 6/2010 | Vroom et al. |
| 2010/0266159 A1 | 10/2010 | Ueki et al. |
| 2011/0255789 A1 | 10/2011 | Neogi |
| 2012/0084185 A1 | 4/2012 | Ciaramitaro et al. |
| 2012/0109792 A1 | 5/2012 | Eftekhari et al. |
| 2012/0173655 A1 | 7/2012 | McEntee |
| 2012/0219175 A1 | 8/2012 | Richardson et al. |
| 2012/0331005 A1 | 12/2012 | White |
| 2013/0103729 A1 | 4/2013 | Cooney et al. |
| 2013/0204840 A1 | 8/2013 | Jarvis et al. |
| 2014/0161365 A1 | 6/2014 | Acharya |
| 2014/0172656 A1 | 6/2014 | Shaw |
| 2014/0180883 A1 | 6/2014 | Regan |

(56) References Cited

U.S. PATENT DOCUMENTS

| | | |
|---|---|---|
| 2014/0201126 A1 | 7/2014 | Zadeh et al. |
| 2014/0201187 A1 | 7/2014 | Larson |
| 2014/0214758 A1 | 7/2014 | Tripathi et al. |
| 2015/0117701 A1 | 4/2015 | Ross et al. |
| 2015/0178856 A1 | 6/2015 | Flores |
| 2015/0205921 A1 | 7/2015 | Dick |
| 2016/0055376 A1 | 2/2016 | Koduru |
| 2016/0328438 A1 | 11/2016 | Bacalzo |
| 2017/0011051 A1 | 1/2017 | Specht |
| 2017/0178199 A1 | 6/2017 | Cessna |
| 2017/0279733 A1 | 9/2017 | Marshall |
| 2017/0286414 A1 | 10/2017 | Roebuck |
| 2018/0018312 A1 | 1/2018 | Guzman et al. |
| 2018/0033092 A1 | 2/2018 | Wang et al. |
| 2018/0113945 A1 | 4/2018 | Dhillon |
| 2018/0300577 A1 | 10/2018 | Kendrick |
| 2019/0114313 A1 | 4/2019 | Roebuck |
| 2019/0172153 A1 | 6/2019 | Wyle et al. |
| 2019/0279039 A1 | 9/2019 | Umeda |
| 2019/0320113 A1 | 10/2019 | Rajvanshi et al. |
| 2020/0065218 A1 | 2/2020 | Bhosale et al. |
| 2020/0233938 A1 | 7/2020 | Sirianni |
| 2020/0236224 A1 | 7/2020 | Harbinson et al. |
| 2021/0090174 A1 | 3/2021 | Altfest et al. |
| 2021/0124919 A1 | 4/2021 | Balakrishnan et al. |
| 2021/0158930 A1 | 5/2021 | Tweedie et al. |
| 2022/0036063 A1 | 2/2022 | Bhuyan et al. |
| 2022/0156300 A1 | 5/2022 | Paruchuri et al. |

OTHER PUBLICATIONS

USPTO; Notice of Allowance dated May 16, 2023 in U.S. Appl. No. 17/557,574.
USPTO; Non-Final Office Action dated Feb. 23, 2024 in U.S. Appl. No. 18/207,033.
USPTO; Non-Final Office Action dated Sep. 22, 2022 in U.S. Appl. No. 17/557,574.
USPTO; Notice of Allowance dated Nov. 17, 2022 in U.S. Appl. No. 15/832,649.
USPTO; Corrected Notice of Allowability dated Dec. 7, 2022 in U.S. Appl. No. 15/832,649.
USPTO; Corrected Notice of Allowance dated Jun. 20, 2023 in U.S. Appl. No. 17/557,574.
USPTO; Notice of Allowance dated Aug. 9, 2023 in U.S. Appl. No. 17/217,917.
USPTO; Corrected Notice of Allowance dated Aug. 22, 2023 in U.S. Appl. No. 17/217,917.
USPTO; Corrected Notice of Allowance dated Aug. 30, 2023 in U.S. Appl. No. 17/217,917.
USPTO; Non-Final Office Action dated Feb. 21, 2018 in U.S. Appl. No. 15/832,587.
USPTO; Final Office Action dated Aug. 6, 2018 in U.S. Appl. No. 15/832,587.
USPTO; Non-Final Office Action dated Apr. 10, 2019 in U.S. Appl. No. 15/832,587.
USPTO; Final Office Action dated Sep. 11, 2019 in U.S. Appl. No. 15/832,587.
USPTO; Restriction Requirement dated Oct. 2, 2019 in U.S. Appl. No. 15/832,625.
USPTO; Non-Final Office Action dated Nov. 4, 2019 in U.S. Appl. No. 15/832,649.
USPTO; Non-Final Office Action dated Nov. 18, 2019 in U.S. Appl. No. 15/832,640.
USPTO; Non-Final Office Action dated Mar. 12, 2020 in U.S. Appl. No. 15/832,587.
USPTO; Non-Final Office Action dated Feb. 19, 2020 in U.S. Appl. No. 15/832,625.
USPTO; Final Office Action dated Mar. 17, 2020 in U.S. Appl. No. 15/832,649.
USPTO; Final Office Action dated May 29, 2020 in U.S. Appl. No. 15/832,640.
USPTO; Final Office Action dated Jul. 24, 2020 in U.S. Appl. No. 15/832,625.
USPTO; Non-Final Office Action dated Aug. 19, 2020 in U.S. Appl. No. 15/832,625.
USPTO; Final Office Action dated Sep. 29, 2020 in U.S. Appl. No. 15/832,587.
USPTO; Advisory Action dated Oct. 26, 2020 in U.S. Appl. No. 15/832,587.
USPTO; Final Office Action dated Nov. 16, 2020 in U.S. Appl. No. 15/832,625.
USPTO; Non-Final Office Action dated Jan. 1, 2021 in U.S. Appl. No. 15/832,587.
USPTO; Non-Final Office Action dated Jan. 4, 2021 in U.S. Appl. No. 15/832,640.
USPTO; Advisory Action dated Jan. 14, 2021 in U.S. Appl. No. 15/832,625.
USPTO; Non-Final Office Action dated Feb. 3, 2021 in U.S. Appl. No. 15/832,649.
USPTO; Non-Final Action dated Feb. 25, 2021 in U.S. Appl. No. 15/832,625.
USPTO; Final Office Action dated May 25, 2021 in U.S. Appl. No. 15/832,587.
USPTO; Final Office Action dated Jun. 7, 2021 in U.S. Appl. No. 15/832,640.
USPTO; Advisory Action dated Jun. 8, 2021 in U.S. Appl. No. 15/832,587.
USPTO; Final Office Action dated Jun. 15, 2021 in U.S. Appl. No. 15/832,649.
USPTO; Advisory Action dated Jul. 15, 2021 in U.S. Appl. No. 15/832,640.
USPTO; Non-Final Action dated Jul. 23, 2021 in U.S. Application No. 16/659, 193.
USPTO; Final Action dated Jul. 26, 2021 in U.S. Appl. No. 15/832,625.
USPTO; Advisory Action dated Sep. 7, 2021 in U.S. Appl. No. 15/832,649.
USPTO, Notice of Allowance dated Sep. 13, 2021 in U.S. Appl. No. 16/659,193.
David Wyle, "Automating Tax Preparation With OCR Technology", https://www.aicpastore.com/Content/media/PRODUCER_CONTENT/Newsletters/Articles_2007/CPA/June/OCR_Technology.jsp, Jul. 16, 2007 (Year: 2007), pp. 1-7.
LPL Financial, "LPL Financial Turbotax 2015 User Guide", www.lplfinancial.com, 2015 (Year: 2015), pp. 1-17.
IRS, "Get PriorYearTax Information from the IRS", https://www.irs.gov/newsroom/get-prior-year-tax-information-from-the-irs, Mar. 1, 2017 (Year: 2017), pp. 1-2.
Rouse, Margaret, "What is Metadata", WhatIs.com, https://whatis.techtarget.com/definition/metadata, TechTarget, Nov. 23, 2017 (Year: 2017), pp. 1-2.
USPTO, Non-Final Office Action dated Sep. 28, 2021 in U.S. Appl. No. 15/832,640.
USPTO, Non-Final Office Action dated Oct. 1, 2021 in U.S. Appl. No. 15/832,625.
USPTO, Non-Final Office Action dated Oct. 10, 2021 in U.S. Appl. No. 15/832,649.
USPTO; Non-Final Action dated Nov. 15, 2021 in U.S. Appl. No. 15/832,587.
IntelliTax for Windows and DOS, Accounting Technology, v 18, n 9, p. 38, Oct. 2002.
Cia, Patricia. Managing Your Bookmarks & Favorites, Feb. 25, 1999, SLA, 2 pages.
Harvey, Greg. Adobe Acrobat 5 PDF for Dummies, 2002, Wiley Publishing Inc., pp. 13-34.
MSPivot, Microsoft Office Excel PivotTable Reports 101, downloaded on Sep. 14, 2008 from http://office.microsoft.com/em-us/excel/HAOI0346321033.aspx?ac= , 12 pages.
SurePrep introduces Tax prep Workflow System, Anonymous, CPA technology Advisor, Ft. Atkinson, Jun./Jul. 2005, vol. 15, Issue 3, 1 page.

(56) References Cited

OTHER PUBLICATIONS

Missing Links: an insider's view, Dauphinais G. Williams, PC Magazine, vol. 6, No. 15, 24 pages.
Ted Needleman, Accounting Today, New York, Aug. 1998, vol. 12, Iss. 14, p. 24, 4 pgs.
USPTO, Restriction/Election Requirement dated Jan. 17, 2007 in U.S. Appl. No. 10/422,133.
USPTO, Non-Final Office Action dated Apr. 17, 2007 in U.S. Appl. No. 10/422,133.
USPTO, Final Office Action dated Sep. 4, 2007 in U.S. Appl. No. 10/422,133.
USPTO, Non-Final Office Action dated Nov. 14, 2007 in U.S. Appl. No. 10/422,133.
USPTO, Final Office Action dated Jun. 9, 2008 in U.S. Appl. No. 10/422,133.
USPTO, Restriction/Election Requirement dated Oct. 2, 2008 in U.S. Appl. No. 10/422,133.
USPTO, Non-Final Office Action dated May 19, 2009 in U.S. Appl. No. 10/422,133.
USPTO, Notice of Allowance dated Sep. 15, 2009 in U.S. Appl. No. 10/422,133.
USPTO, Supplemental Notice of Allowance dated Nov. 9, 2009 in U.S. Appl. No. 10/422,133.
USPTO, Non-Final Office Action dated Sep. 14, 2007 in U.S. Appl. No. 10/430,830.
USPTO, Final Office Action dated Jan. 8, 2008 in U.S. Appl. No. 10/430,830.
USPTO, Non-Final Office Action dated Jan. 13, 2009 in U.S. Appl. No. 10/430,830.
USPTO, Non-Final Office Action dated Jun. 25, 2009 in U.S. Appl. No. 10/430,830.
USPTO, Notice of Allowance dated Sep. 30, 2009 in U.S. Appl. No. 10/430,830.
USPTO, Non-Final Office Action dated Nov. 9, 2011 in U.S. Appl. No. 12/510,179.
USPTO, Non-Final Office Action dated Apr. 9, 2012 in U.S. Appl. No. 12/510,179.
USPTO, Notice of Allowance dated Sep. 12, 2012 in U.S. Appl. No. 12/510,179.
USPTO, Non-Final Office Action dated Feb. 25, 2008 in U.S. Appl. No. 10/448,483.
USPTO, Notice of Allowance dated Sep. 22, 2008 in U.S. Appl. No. 10/448,483.
USPTO, Restriction/Election Requirement dated Aug. 28, 2008 in U.S. Appl. No. 11/031,060.
USPTO, Non-Final Office Action dated Nov. 12, 2008 in U.S. Appl. No. 11/031,060.
USPTO, Final Office Action dated Jun. 24, 2009 in U.S. Appl. No. 11/031,060.
USPTO, Non-Final Office Action dated Oct. 27, 2009 in U.S. Appl. No. 11/031,060.
USPTO, Final Office Action dated May 3, 2010 in U.S. Appl. No. 11/031,060.
USPTO, Notice of Allowance dated Oct. 6, 2010 in U.S. Appl. No. 11/031,060.
USPTO, Non-Final Office Action dated Apr. 11, 2008 in U.S. Appl. No. 10/903,637.
USPTO, Final Office Action dated Oct. 1, 2008 in U.S. Appl. No. 10/903,637.
USPTO, Non-Final Office Action dated Mar. 16, 2009 in U.S. Appl. No. 10/903,637.
USPTO, Notice of Allowance dated Sep. 4, 2009 in U.S. Appl. No. 10/903,637.
USPTO, Non-Final Office Action dated Nov. 24, 2008 in U.S. Appl. No. 11/766,019.
USPTO, Non-Final Office Action dated May 27, 2009 in U.S. Appl. No. 11/766,019.
USPTO, Final Office Action dated Nov. 5, 2009 in U.S. Appl. No. 11/766,019.
USPTO, Notice of Allowance dated May 5, 2010 in U.S. Appl. No. 11/766,019.
USPTO, Non-Final Office Action dated Jun. 12, 2013 in U.S. Appl. No. 13/155,195.
USPTO, Final Office Action dated Jan. 16, 2014 in U.S. Appl. No. 13/155,195.
USPTO, Notice of Allowance dated Apr. 25, 2014 in U.S. Appl. No. 13/155,195.
USPTO, Non-Final Office Action dated May 23, 2016 in U.S. Appl. No. 14/325,207.
USPTO, Final Office Action dated Dec. 23, 2016 in U.S. Appl. No. 14/325,207.
USPTO, Non-Final Office Action dated Sep. 5, 2017 in U.S. Appl. No. 14/325,207.
USPTO, Notice of Allowance dated Apr. 27, 2018 in U.S. Appl. No. 14/325,207.
USPTO, Non-Final Office Action dated Mar. 28, 2013 in U.S. Appl. No. 13/243,774.
USPTO, Non-Final Office Action dated Oct. 23, 2013 in U.S. Appl. No. 13/243,774.
USPTO, Notice of Allowance dated Mar. 31, 2014 in U.S. Appl. No. 13/243,774.
USPTO, Notice of Allowance dated Oct. 29, 2013 in U.S. Appl. No. 13/542,345.
USPTO, Notice of Allowance dated Aug. 19, 2019 in U.S. Appl. No. 15/922,821.
USPTO, Corrected Notice of Allowance dated Aug. 28, 2019 in U.S. Appl. No. 15/922,821.
USPTO, Notice of Allowance dated Aug. 14, 2019 in U.S. Appl. No. 16/047,346.
USPTO, Restriction/Election Requirement dated Dec. 21, 2015 in U.S. Appl. No. 12/557,473.
USPTO, Non-Final Office Action dated Oct. 25, 2012 in U.S. Appl. No. 12/557,473.
USPTO, Non-Final Office Action dated Jun. 19, 2013 in U.S. Appl. No. 12/557,473.
USPTO, Non-Final Office Action dated Oct. 23, 2014 in U.S. Appl. No. 12/557,473.
USPTO, Non-Final Office Action dated Jun. 2, 2016 in U.S. Appl. No. 12/557,473.
USPTO, Final Office Action dated Dec. 31, 2013 in U.S. Appl. No. 12/557,473.
USPTO, Final Office Action dated May 22, 2015 in U.S. Appl. No. 12/557,473.
USPTO, Notice of Allowance dated Jun. 6, 2014 in U.S. Appl. No. 12/557,473.
International Searching Authority, International Written Opinion dated Oct. 26, 2006 in Application No. PCT/US2005/25711.
International Searching Authority, International Preliminary Report on Patentability dated Jan. 30, 20007 in Application No. PCT/US2005/25711.
International Searching Authority, International Preliminary Report on Patentability dated Jan. 30, 20007 in Application No. PCT/US2005/046397.
International Searching Authority, International Written Opinion dated Jul. 23, 2007 in Application No. PCT/US2005/046397.
USPTO, Final Office Action dated Dec. 15, 2021 in U.S. Appl. No. 15/832,625.
USPTO, Notice of Allowance dated Dec. 16, 2021 in U.S. Appl. No. 15/832,640.
Peasron, "Grouping and Filtering with Metadata" Managing Files and Searching in Windows 8.1. Informit. Apr. 7, 2014; <https://www.informit.com/articles/article.aspx?p=2186997 &seq Num=5> (Year: 2014), 2 pages.
USPTO, Supplemental Notice of Allowance dated Dec. 30, 2022 in U.S. Appl. No. 15/832,640.
USPTO, Advisory Action dated Feb. 24, 2022 in U.S. Appl. No. 15/832,625.
USPTO, Notice of Allowance dated Mar. 18, 2022 in U.S. Appl. No. 15/832,587.
Brian Tankersley, "Tax Document Automation Tools Come of Age", www.CPAPracticeAdviser.com Jul. 2011 (Year: 2011), pp. 21-23.

(56) References Cited

OTHER PUBLICATIONS

USPTO, Final Office Action dated Apr. 6, 2022 in U.S. Appl. No. 15/832,649.
USPTO, Advisory Action dated May 9, 2022 in U.S. Appl. No. 15/832,649.
USPTO; Restriction/Election Requirement dated Jun. 28, 2024 in U.S. Appl. No. 17/726,038.
USPTO; Final Office Action dated Jul. 18, 2024 in U.S. Appl. No. 18/207,033.
USPTO; Advisory Action dated Aug. 27, 2024 in U.S. Appl. No. 18/207,033.
USPTO; Non-Final Office Action dated Aug. 9, 2024 in U.S. Appl. No. 17/726,038.
USPTO; Notice of Allowance dated Sep. 13, 2024 in U.S. Appl. No. 18/207,033.
USPTO; Restriction/Election Requirement dated Sep. 19, 2024 in U.S. Appl. No. 18/506,695.
USPTO; Non-Final Office Action dated Oct. 31, 2024 in U.S. Appl. No. 18/506,695.
USPTO; Final Office Action dated Oct. 17, 2024 in U.S. Appl. No. 17/726,038.
Riba et al., "Table Detection in Invoice Documents by Graph Neural Networks," 2019 International Conference on Document Analysis and Recognition (ICDAR), Sydney, NSW, Australia, 2019, pp. 122-127, doi: 10.1109/ICDAR.2019.00028.
USPTO; Notice of Allowance dated Nov. 26, 2024 in U.S. Appl. No. 17/726,038.
Blanchard et al., "Automatic Generation of a Custom Corpora for Invoice Analysis and Recognition." 2019 International Conference on Document Analysis and Recognition Workshops (ICDARW) 7 (2019), DOI: 10.1109/ICDARW.2019.60121, pp. 1-4.
Alaei et al. "Logo and seal based administrative document image retrieval: A survey." Comput. Sci. Rev. 22 (2016), https://doi.org/10.1016/j.cosrev.2016.09.002, pp. 47-63.
Oral et al. "Information Extraction from Text Intensive and Visually Rich Banking Documents." Inf. Process. Manag. 57 (2020), https://doi.org/10.1016/j.ipm.2020.102361, pp. 1-24.
Roy et al., "Seal Detection and Recognition: An Approach for Document Indexing," 2009 10th International Conference on Document Analysis and Recognition, Barcelona, Spain, 2009, pp. 101-105, doi: 10.1109/ICDAR.2009.128.

\* cited by examiner

FIGURE 2

```
{
  "TemplateName":  "FORM_8879_2020_V1",
  "Templatefieldlst":  [
    {
      "fieldname":  "Taxpayername",
      "left":  {
        "mincoordinate":  35.0,
        "maxcoordinate":  35.0
      },
      "top":  {
        "mincoordinate":  670.0,
        "maxcoordinate":  670.0
      },
      "top":  {
        "mincoordinate":  660.0,
        "maxcoordinate":  660.0
      },
      "right":  {
        "mincoordinate":  453.0,
        "maxcoordinate":  453.0
      },
      "ReferenceFieldValue":  "JACK ANDERSON
      "Regex":  null,
      "Quadrant":  null
    },
```

| Fieldname | Fieldvalue | Left | Right | Top | Bottom |
|---|---|---|---|---|---|
| Taxpayname | JACK ANDERSON | 35 | 453 | 670 | 660 |
| spousename | JILL ANDERSON | 35 | 453 | 647 | 636 |
| taxpayssn | 111 11 1111 | 457 | 577 | 673 | 659 |
| spousessn | 222 22 2222 | 457 | 577 | 649 | 635 |
| AdjGrossIncome | 130516. | 463 | 575 | 597 | 588 |
| TotalTax | 11483. | 463 | 577 | 587 | 576 |
| fedincometax | 4265. | 462 | 576 | 574 | 564 |

FIGURE 5

EXTRACT DATA FROM A TRUE PDF PAGE

CROSS-REFERENCE TO RELATED APPLICATIONS

This application claims priority to and the benefit of India Provisional Application No. 202211036780 filed on Jun. 27, 2022 and entitled "EXTRACT DATA FROM A TRUE PDF PAGE." This application claims priority to, and the benefit of, U.S. Ser. No. 63/238,612 filed on Aug. 30, 2021 and entitled "MORE EFFICIENTLY EXTRACTING DATA FROM A TRUE PORTABLE DOCUMENT FORMAT (PDF) DOCUMENT." All of the foregoing applications are hereby incorporated in their entirety by reference for all purposes.

TECHNICAL FIELD

This disclosure generally relates to extracting text from a portable document format (PDF) document, and more particularly, to a system and method for using the position of data to extract the data from a true PDF document, without using optical character recognition (OCR).

BACKGROUND

PDF documents may be categorized in three different types. The types may include true PDF pages, image-only PDF pages (or scanned PDF pages) and searchable PDF pages. The PDF category may depend on the way the file was originally created. The way the document was originally created also defines whether the content of the PDF (e.g., text, images, tables) can be accessed or whether the content may be inaccessible (or "locked") in an image of the page. The problem with image-only PDF pages is that the content cannot be extracted from the pages. The problem with the searchable PDF pages is that the content is often extracted with an OCR tool that may not be reliable. As such, a need exists to identify and extract content from true PDF pages.

SUMMARY

In various embodiments, the system may perform a method comprising analyzing, using a processor, metadata of a text layer of a page of a first pdf document to determine that the pdf document is a first true pdf document; receiving, at the processor, the first true pdf document, in response to the first pdf document being the first true pdf document; receiving, at the processor, a selection of a field including first data to be extracted from the first true pdf document; displaying, by the processor, the first data; creating, at the processor, a template including the coordinates corresponding to the selected field and the first data of the first true pdf document; and extracting, using the processor, from an accessible text layer of a second true pdf document, second data based on the template from the first true pdf document.

In various embodiments, the analyzing metadata of the text layer of the page of the first pdf document may include determining whether the text layer can be accessed for retrieval of data. The analyzing metadata may include extracting properties of a pdf file. The analyzing metadata may include determining that a hidden-text field of the metadata is set to false. The first data may include at least one of words, text, numbers, characters, symbols, regions, locations or empty spaces. The method may further comprise saving the layout of the template into a file format. The layout may include at least one of coordinates, template, field names, reference field values, region or quadrant information. The layout may be stored in JavaScript Object Notation (JSON) file format.

The receiving the selection of the field may be based on at least one of a selection of text elements or receiving coordinates of a bounding box drawn around the text elements. The receiving the selection of the field may be based on receiving coordinates of a bounding box drawn around text elements, wherein the coordinates are obtained by analyzing a number of pixels from each border of the first true pdf document to the text elements. The extracting from the accessible text layer the second data may include using logic to iterate through the accessible text layer and extracting the second data based on the coordinates. The receiving the selection of the field may be based on receiving coordinates of a bounding box drawn around text elements, and further comprising adjusting, by the processor, the bounding box to confirm the text elements are accurate. The receiving the selection of the field may be based on regex expressions extracting a field value from the field.

The method may further comprise suggesting a replacement value for a field value in the field. The method may further comprise applying a regex to clean up a field value from the field. The method may further comprise identifying a type of a page based on the template. The method may further comprise generating a tabular display of the field. The method may further comprise displaying, using a display screen, a listing of the second data and the coordinates corresponding to the selected field from the first true pdf document or the second true pdf document.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings:

FIG. 2 shows an exemplary true PDF document with a rectangle surrounding an area with the desired text to create a captured field, in accordance with various embodiments.

FIG. 3 shows an exemplary data file for the created template with the captured field that encompasses the desired text, in accordance with various embodiments.

FIG. 4 shows an exemplary test template showing identified test fields based on the position coordinates of the captured field, in accordance with various embodiments.

FIG. 5 shows an exemplary table of the field name, field value and the field coordinates, in accordance with various embodiments.

DETAILED DESCRIPTION

Figure 1:
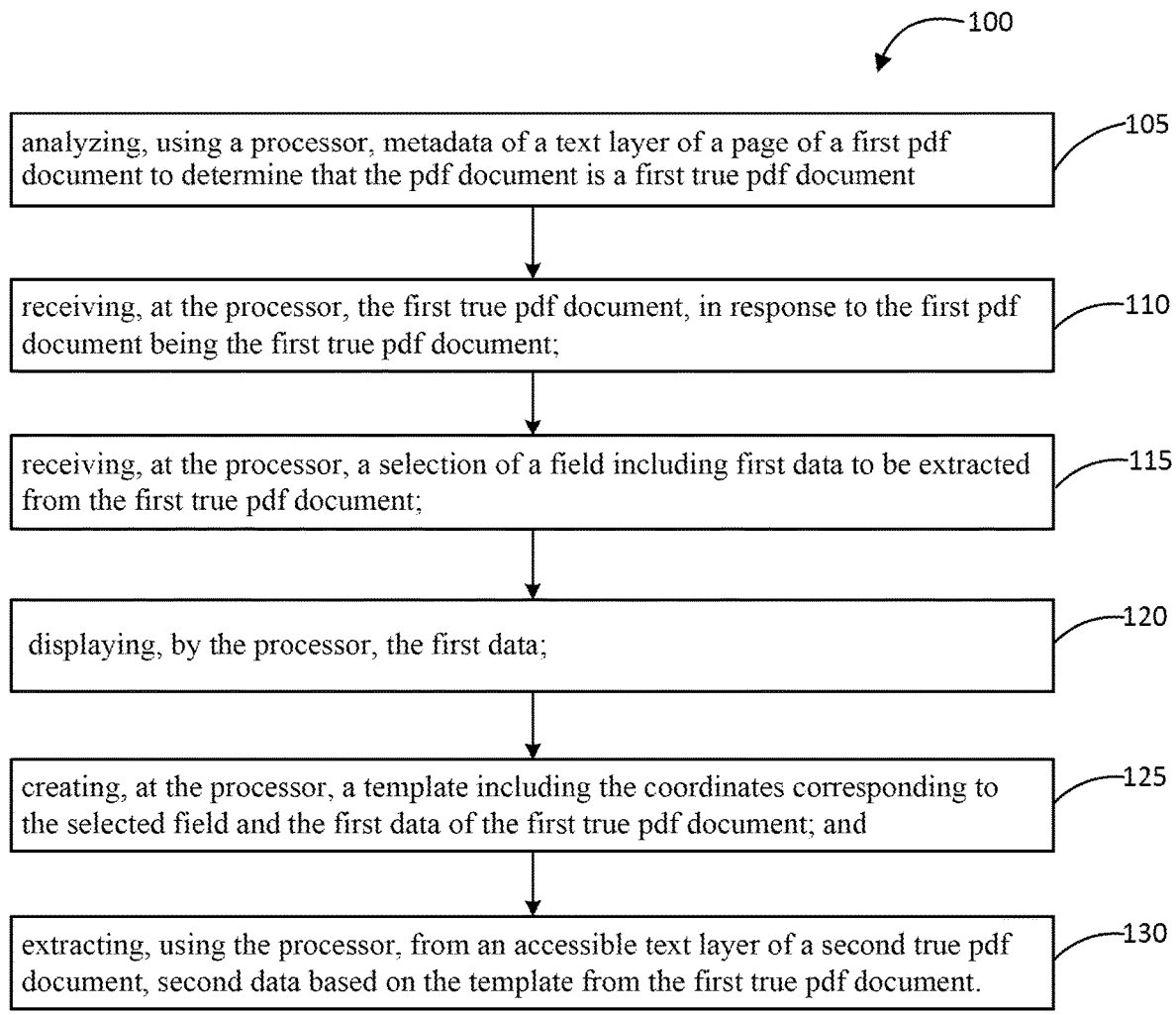
FIG. 1 shows a flowchart of an exemplary method, in accordance with various embodiments.

In general, as set forth in FIG. 1, in various embodiments, the system may perform a method 100 comprising analyzing, using a processor, metadata of a text layer of a page of a first pdf document to determine that the pdf document is a first true pdf document (step 105); receiving, at the processor, the first true pdf document, in response to the first pdf document being the first true pdf document (step 110); receiving, at the processor, a selection of a field including first data to be extracted from the first true pdf document (step 115); displaying, by the processor, the first data; (step 120); creating, at the processor, a template including the coordinates corresponding to the selected field and the first data of the first true pdf document (step 125); and extracting, using the processor, from an accessible text layer of a second true pdf document, second data based on the template from the first true pdf document (step 130).

The method may reduce the process to extract data from a PDF document to 0.52 seconds per page, whereas the OCR technology may take 4.32 seconds per page (based on a sample size of 23,719 pages). The system may also provide better accuracy and improved success rate (100% accuracy in extracting text) compared to OCR technology (99.5% accuracy, based on sample size of 23,719 pages). The system may also provide a cost savings of $0.002-$0.0003 per page.

This disclosure may describe the process implemented by a system, but the process contemplates being implemented by the system, a tool, an app, a website, a SaaS offering, an algorithm, artificial intelligence, machine learning, expert systems logic, fuzzy text matching, text layer extraction, a human user and/or any combination. With respect to the SaaS offering, third-party applications may connect to the system to perform the extraction process. A sample integration use case may include a user uploading a PDF document to the system and the user receiving an output of text extraction in an XML/json format.

For more information related to text layer extraction, see U.S. patent application Ser. No. 16/047,346, entitled "System and Method for Automatic Detection and Verification of Optical Character Recognition Data," filed Jul. 27, 2018 and U.S. patent application Ser. No. 15/922,821 entitled "System and Method for Automatic Detection and Verification of Optical Character Recognition Data," filed Mar. 15, 2018, the contents of which are herein incorporated by reference in their entirety for all purposes. This disclosure may include other data extraction functions such as, for example, those functions set forth in U.S. Reissue Pat. No. RE45,007; U.S. Pat. Nos. 10,489,644; 8,655,075; 11,232,300 and U.S. Ser. No. 17/217,917, which are hereby incorporated by reference in their entireties for all purposes.

A PDF may include text, images, multimedia elements, web page links, execute JavaScript and include other content. A PDF may include different layers comprising a header, body, xref table and trailer. The header may be in the first line of the PDF file and include a version number of the PDF file format specification used by the document. The body of the PDF document may include objects. The objects may include text, text streams, images, other multimedia elements, etc. The body section may hold all the document's data visible by the user. The xref table may include a cross-reference table. The cross-reference table may include the references to all the objects in the document. The cross-reference table allows random access to objects in the file, so the entire PDF document does not need to be reviewed in order to locate the particular object Each object may be represented by one entry in the cross-reference table, which may be 20 bytes long. To access the cross-reference table, the system may open the PDF with a text editor. The cross-reference table may include four subsections including the object number, the number of objects in the subsection and the object represented by a number. The trailer provides information to the application reading the PDF document about how the application may find the cross-reference table and other special objects. The PDF may include incremental updates by appending objects to the end of the PDF file, without having to rewrite the entire file. Because of this process for updates, changes to a PDF document can be saved quickly.

The system may include a method of determining if a document is a true PDF document. A true PDF document may include a digitally created PDF that may consist of text and/or images. The PDF may be created using software such as Microsoft® Word®, Excel® or via the "print" function within a software application (virtual printer). To determine if the document is a true PDF, in various embodiments, the system may analyze the metadata of the PDF file. The metadata may be stored as part of the PDF file properties. The system may read the metadata by extracting the file properties of a given PDF file, wherein the PDF file properties may include, for example, the number of pages, dimensions of pages, details of images, text elements, etc. The system may also review a metadata field called hidden-text. If the value of this hidden-text field is set to false, the system marks the page as a true pdf page.

Figure 2:
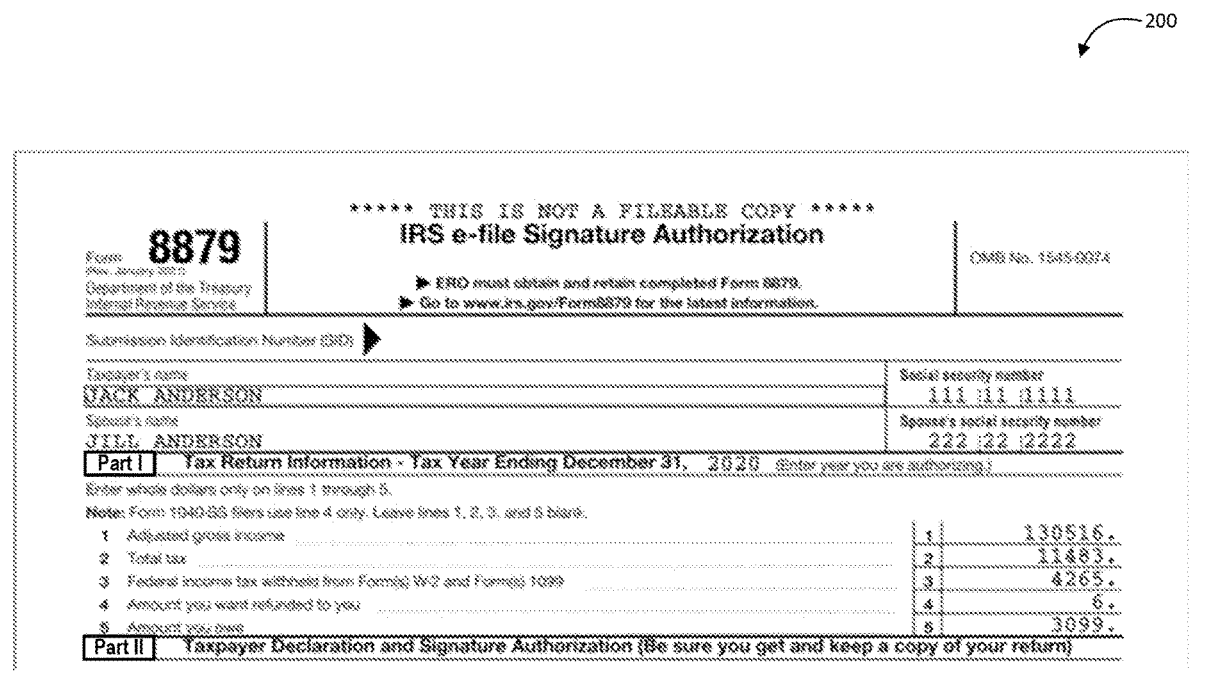

In various embodiments, and as set forth in FIG. 2, to define a template, the system may include a tool that defines the target content elements 200 (e.g., text) that will be captured by the system (e.g., desired for extraction from the PDF page). While the target content elements may be described as text, the system may similarly capture any target content elements. For example, the target content elements may include one or more words, text, numbers, characters, symbols, regions, locations and/or empty spaces. The system may also use the tool to save the layout into a file format. The layout may include top, left, bottom, right coordinates apart from the template, field names, reference field values, region, and quadrant information. This layout information may be stored as a JavaScript Object Notation (JSON) file format. A JSON file is a file that stores simple data structures and objects in JSON format. The content of the JSON file format 300 may be hierarchical, as shown in FIG. 3. For example, the system may open a template PDF page. The system may open the template PDF by using an embedded component (e.g., PDFTron viewer) to open and view the PDF page in the system. The system may select target text elements on the PDF page and/or draw a bounding box (e.g., rectangle) around the target text. In various embodiments, a user may locate the area to be extracted. The system may receive input on where to put the boundaries of the rectangle based on a user using a mouse (by right click) to draw a rectangle on the display. While described as a bounding box, the system contemplates that the box may be any shape or configuration including, a circle or amorphous shape. The system may capture the coordinates of the bounding box (e.g., X-Y coordinates of the corners of the bounding box) to create the template, as shown in FIG. 3. The system, an algorithm and/or a human may obtain those X-Y coordinates from the PDF document using any type of element recognition system or optical character recognition system such as, for example, Amazon Textract. The location of the bounding box may include the four different coordinates corresponding to each corner of the bounding box. Such coordinates may be determined based on the pixel space. For example, the system may analyze the number of pixels from each border of the document to the target text.

The system may capture the target text in the bounding box from the text layer. The system may capture the text by using logic to iterate through the text layer and extract the text element based on the coordinates. To test the target text, the system may display the target text from the bounding box to the user. The user may verify the target text. To further test the target text, the system may re-select the rectangle and adjust the scope of the rectangle. The adjusting of the rectangle confirms the text is accurate because the coordinates will be different every time a rectangle is rescoped and/or adjusted.

As stated above, the template may include instructions for obtaining the coordinates of the bounding box around the target text. The template may also use associated regex expressions to extract the field value. A regex may search for text or patterns of text. For example, the system may select the value between brackets, etc. The system may identify a region and apply regex on the extracted value. The applying regex may help clean up the extracted text. The template may suggest a replacement value for the field value. Template may include a field called "ReferencedFieldValue" under each field definition, which can hold a suggested value that can be used to replace the extracted text. The template may also provide possible hints on where the bounding box or target text may exist. The template may include a field (called quadrant) that indicates a possible location of the field. This quadrant may help when the same or similar text is found in multiple locations. The system may also include business rules for determining the boundaries of the bounding box and/or for data transformation. A template's regex may be used to clean up the data. For example, if the field that is being extracted is an amount, then the regex can be applied to remove the locale/format of the extracted amount value. For example, the system may convert 2,340 to 2340 by removing the comma format.

Figure 4:
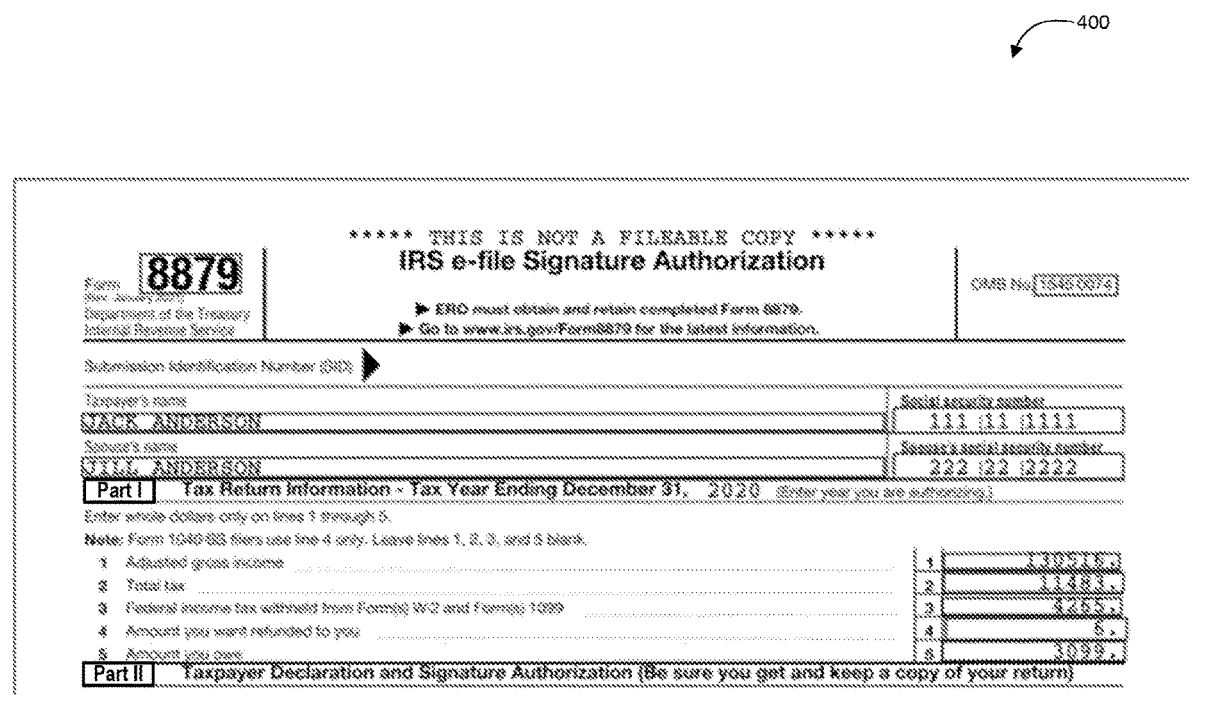

In various embodiments, the template may be used as an identification or complete recognition. As set forth above, the system extracted the data using the coordinates from the template which may be called recognition. In various embodiments, the system may also use a template to identify the type of a given page. For example, the system may define a template to identify if a given page is a W-2 by reading a text from a targeted area and comparing that value to a suggested value (e.g., from field "ReferenceFieldValue"). The template may not be human readable. The template may be read by the system. The template may be saved into any storage medium. For example, the template may be saved into a public or private repository, which may be hosted locally or in the cloud. In various embodiments, and as set forth in FIG. 4, the system may test the template 400 against a single document or multiple documents. In particular, the system may submit one or more documents (e.g., W-2 pages) to test the accuracy of extraction. After a new page is loaded into (or recognized by) the system, the system uses the template to identify the text fields based on X-Y coordinates of the bounding box. In various embodiments, and as shown in FIG. 5, the system may also generate a tabular display of the identified text fields 500. The tabular display may include a field name, field value and X-Y coordinates. In various embodiments, the system may work in any of the Windows operating systems with .net framework (e.g., 4.5.2 and above), JSON and SQL server.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompass 140ed by the present claims. Moreover, it is not necessary for a device or method to address each and every problem sought to be solved by the present disclosure, for it to be encompass 140ed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at predetermined intervals, periodically, randomly, once, more than once, or in response to a suitable request or action. Any of the information may be distributed and/or accessed via a software enabled link, wherein the link may be sent via an email, text, post, social network input, and/or any other method known in the art.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, crossover bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, ProX-Y based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

We claim:

1. A method comprising:
   receiving, by one or more processors, a first pdf document;
   opening, by the one or more processors using text editor, the first pdf document by using an embedded component to access a cross-reference table, wherein the cross-reference table allows random access to objects in the file;
   extracting, by the one or more processors, file properties from the cross-reference table and layout information from a JSON file, to enable reading of metadata;
   analyzing, using the one or more processors, the metadata of a text layer of a page of the first pdf document to determine that the first pdf document is a first true pdf document;
   receiving, at the one or more processors, a selection of a field including first data to be extracted from the first true pdf document;
   displaying, by the one or more processors, the first data;
   creating, at the one or more processors, a template including the coordinates corresponding to the selected field and the first data of the first true pdf document; and
   extracting, by the one or more processors using regex expressions, from an accessible text layer of a second true pdf document, second data based on the template from the first true pdf document.

2. The method of claim 1, wherein the analyzing metadata of the text layer of the page of the first pdf document includes determining whether the text layer can be accessed for retrieval of data.

3. The method of claim 1, wherein the analyzing metadata includes extracting properties of a pdf file.

4. The method of claim 1, wherein the analyzing metadata includes determining that a hidden-text field of the metadata is set to false.

5. The method of claim 1, wherein the first data includes at least one of words, text, numbers, characters, symbols, regions, locations or empty spaces.

6. The method of claim 1, further comprising saving, by the one or more processors, the template into a file format.

7. The method of claim 1, wherein the template includes at least one of coordinates, field names, reference field values, region or quadrant information.

8. The method of claim 1, wherein the template is stored in JavaScript Object Notation (JSON) file format.

9. The method of claim 1, wherein the receiving the selection of the field is based on at least one of a selection of text elements or receiving coordinates of a bounding box drawn around the text elements.

10. The method of claim 1, wherein the receiving the selection of the field is based on receiving coordinates of a bounding box drawn around text elements, wherein the coordinates are obtained by analyzing a number of pixels from each border of the first true pdf document to the text elements.

11. The method of claim 1, wherein the extracting from the accessible text layer the second data includes using logic to iterate through the accessible text layer and extracting the second data based on the coordinates.

12. The method of claim 1, wherein the receiving the selection of the field is based on receiving coordinates of a bounding box drawn around text elements, and further comprising adjusting, by the one or more processors, the bounding box to confirm the text elements are accurate.

13. The method of claim 1, wherein the receiving the selection of the field is based on regex expressions extracting a field value from the field.

14. The method of claim 1, further comprising suggesting, by the one or more processors, a replacement value for a field value in the field.

15. The method of claim 1, further comprising applying, by the one or more processors, a regex to clean up a field value from the field.

16. The method of claim 1, further comprising identifying, by the one or more processors, a type of a page based on the template.

17. The method of claim 1, further comprising generating, by the one or more processors, a tabular display of the field.

18. The method of claim 1, further comprising displaying, using a display screen, a listing of the second data and the coordinates corresponding to the selected field from the first true pdf document or the second true pdf document.

19. An article of manufacture including one or more non-transitory, tangible computer readable storage mediums having instructions stored thereon that, in response to execution by one or more processors, cause the one or more processors to perform operations comprising:

receiving, by the one or more processors, a first pdf document;

opening, by the one or more processors using text editor, the first pdf document by using an embedded component to access a cross-reference table, wherein the cross-reference table allows random access to objects in the file;

extracting, by the one or more processors, file properties from the cross-reference table and layout information from a JSON file, to enable reading of metadata;

analyzing, using the one or more processors, the metadata of a text layer of a page of the first pdf document to determine that the first pdf document is a first true pdf document;

receiving, at the one or more processors, a selection of a field including first data to be extracted from the first true pdf document;

displaying, by the one or more processors, the first data;

creating, at the one or more processors, a template including the coordinates corresponding to the selected field and the first data of the first true pdf document; and extracting, by the one or more processors using regex expressions, from an accessible text layer of a second true pdf document, second data based on the template from the first true pdf document.

20. A system comprising:

one or more processors; and one or more tangible, non-transitory memory memories configured to communicate with the one or more processors, the one or more tangible, non-transitory memories having instructions stored thereon that, in response to execution by the one or more processors, cause the one or more processors to perform operations comprising:

receiving, by the one or more processors, a first pdf document;

opening, by the one or more processors using text editor, the first pdf document by using an embedded component to access a cross-reference table, wherein the cross-reference table allows random access to objects in the file;

extracting, by the one or more processors, file properties from the cross-reference table and layout information from a JSON file, to enable reading of metadata;

analyzing, using the one or more processors, the metadata of a text layer of a page of the first pdf document to determine that the first pdf document is a first true pdf document;

receiving, at the one or more processors, a selection of a field including first data to be extracted from the first true pdf document;

displaying, by the one or more processors, the first data;

creating, at the one or more processors, a template including the coordinates corresponding to the selected field and the first data of the first true pdf document; and extracting, by the one or more processors using regex expressions, from an accessible text layer of a second true pdf document, second data based on the template from the first true pdf document.

\* \* \* \* \*

UNITED STATES PATENT AND TRADEMARK OFFICE
CERTIFICATE OF CORRECTION

| | | |
|---|---|---|
| PATENT NO. | : 12,307,801 B2 | Page 1 of 1 |
| APPLICATION NO. | : 17/870225 | |
| DATED | : May 20, 2025 | |
| INVENTOR(S) | : Srinivas Lingineni et al. | |

It is certified that error appears in the above-identified patent and that said Letters Patent is hereby corrected as shown below:

In the Claims

Column 20, Claim 20, Line 3, delete "memory memories" and insert --memories--

Signed and Sealed this
Seventeenth Day of June, 2025

Coke Morgan Stewart
*Acting Director of the United States Patent and Trademark Office*